US007877592B2

(12) United States Patent
Sun et al.

(10) Patent No.: US 7,877,592 B2
(45) Date of Patent: Jan. 25, 2011

(54) SYSTEM AND METHODS FOR EFFICIENT AND COOPERATIVE OPERATING SYSTEM SWITCHING

(75) Inventors: Jun Sun, Fremont, CA (US); Dong Zhou, San Jose, CA (US); Steve Longerbeam, San Jose, CA (US)

(73) Assignee: NTT DOCOMO, Inc., Tokyo (JP)

( * ) Notice: Subject to any disclaimer, the term of this patent is extended or adjusted under 35 U.S.C. 154(b) by 612 days.

(21) Appl. No.: 11/871,073

(22) Filed: Oct. 11, 2007

(65) Prior Publication Data

US 2008/0133903 A1 Jun. 5, 2008

Related U.S. Application Data

(60) Provisional application No. 60/872,914, filed on Dec. 4, 2006.

(51) Int. Cl.

*G06F 1/24* (2006.01)
*G06F 9/00* (2006.01)
*G06F 15/177* (2006.01)
*G06F 3/00* (2006.01)
*G06F 13/00* (2006.01)
*G06F 12/00* (2006.01)
*G06F 11/00* (2006.01)
*G06F 9/46* (2006.01)

(52) U.S. Cl. .......................... 713/100; 713/1; 709/221; 710/59; 710/104; 711/147; 714/15; 718/108

(58) Field of Classification Search .................... 713/1, 713/100; 709/221; 710/59, 104; 711/147; 714/15; 718/108
See application file for complete search history.

(56) References Cited

U.S. PATENT DOCUMENTS 6,678,712 B1 * 1/2004 McLaren et al. ............ 718/100

(Continued)

FOREIGN PATENT DOCUMENTS

WO WO-2006066473 6/2006

(Continued)

OTHER PUBLICATIONS

R. J. Creasy, "The origin of the VM/370 time-sharing system," IBM Journal of Research and Development, vol. 25, pp. 483-490, 1981.

(Continued)

*Primary Examiner*—Stefan Stoynov
(74) *Attorney, Agent, or Firm*—Blakely, Sokoloff, Taylor & Zafman LLP

(57) ABSTRACT

A method and apparatus is disclosed herein for performing operating system (OS) switching. In one embodiment, the method comprising enabling a plurality of operating systems to run concurrently on a computer, wherein a first operating system in the plurality of operating systems is actively being run, the method comprising, identifying a second operating system of a plurality of operating systems that is to be active next, exchanging information between the first and second operating systems using a storage area accessible by the first and second operating systems, causing the first operating system to become inactive by performing a suspend operation; and causing the second operating system to become active by performing a resume operation to cause the second operating system to resume operation, wherein the information controls which operations are performed as part of one or both of the suspend and resume operations.

23 Claims, 9 Drawing Sheets

U.S. PATENT DOCUMENTS

| | | | | |
|---|---|---|---|---|
| 6,772,419 | B1 * | 8/2004 | Sekiguchi et al. | 719/319 |
| 7,409,536 | B2 * | 8/2008 | Guo et al. | 713/1 |
| 7,587,723 | B2 * | 9/2009 | Boutcher et al. | 719/325 |
| 2001/0018717 | A1 | 8/2001 | Shimotono | |

FOREIGN PATENT DOCUMENTS

| | | |
|---|---|---|
| WO | WO-2007109145 A | 9/2007 |

OTHER PUBLICATIONS

VMWare. VMWare home page. Web site: http://www.vmware.com.

B. Dragovic, K. Fraser, S. Hand, T. Harris, A. Ho, I. Pratt, A. Warfield, P. Barham, and R. Neugebauer, "Xen and the Art of Virtualization," in Proceedings of the 19th ACM Symposium on Operating Systems Principles. 2003.

A. Whitaker, M. Shaw, and S. Bribble, "Denali: Lightweight virtual machines for distributed networked applications," in Proceedings of the USENIX Annual Technical Conference, Monterey, CA. 2002.

GNU. GNU Grub Project. Web site: http://www.gnu.org/software/grub/, May 8, 2005.

Opersys. Adaptive Domain Environment for Operating Systems. Web site: http://www.opersys.com/adeos/. 2001.

Jun Sun et al, Supporting Multiple OSes with OS switching, 2007 USENIX Annual Technical Conferece on Proceedings of the USENIX Annual Technical Conference, Jun. 17, 2007-Jun. 22, 2007, XP002485362, Santa Clara, CA, USA, pp. 357-362.

International Search Report for PCT Patent Application No. PCT/US2007/025069, 4 pgs., Jul. 7, 2008.

Written Opinion of the International Searching Authority for PCT Patent Application No. PCT/US2007/025069, 8 Pgs., Jul. 7, 2008.

PCT International Preliminary Report on Patentability for corresponding PCT Patent Application No. PCT/US2007/025069, Jun. 17, 2010, 8 pgs.

* cited by examiner

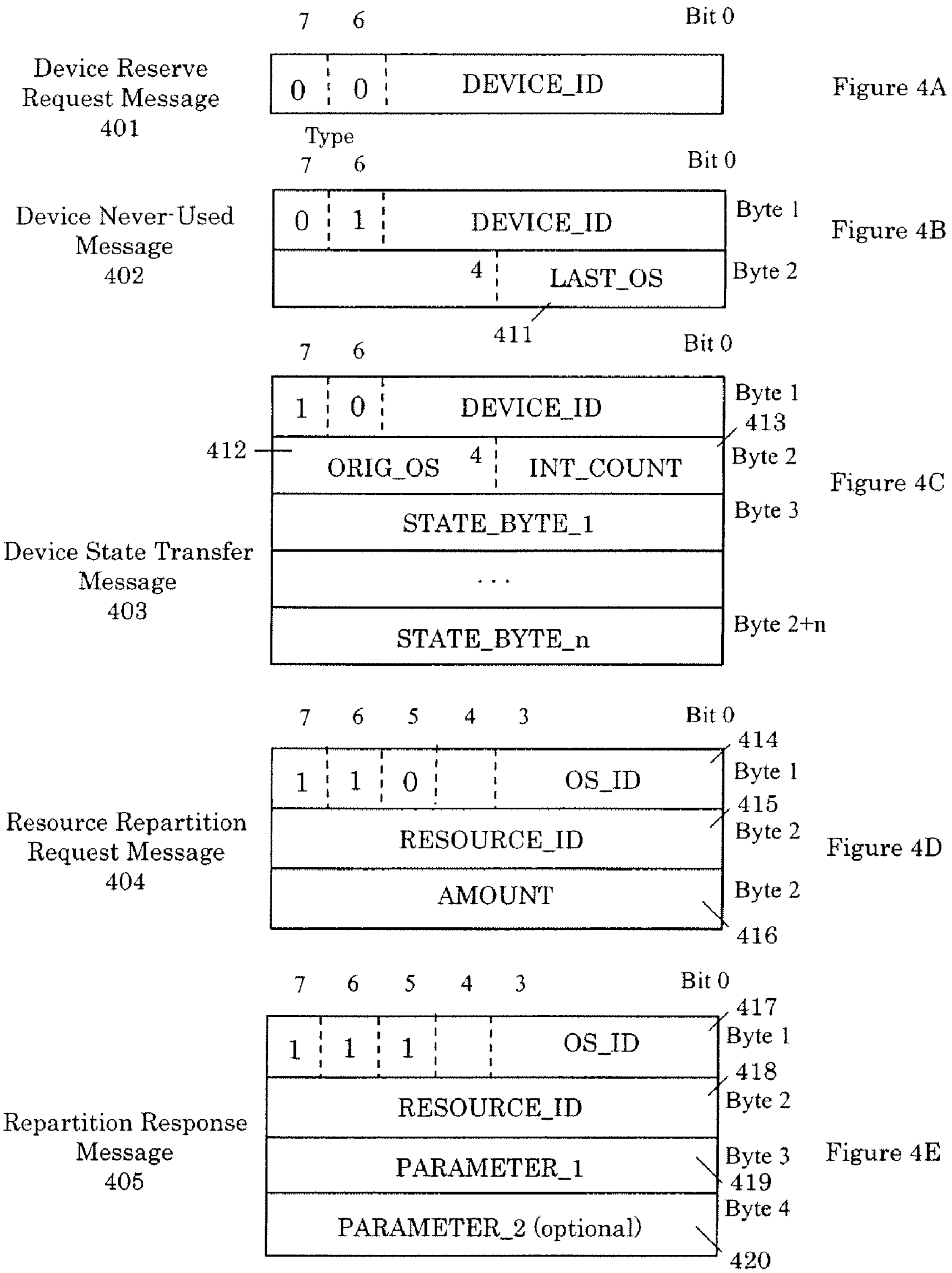

7
6
Bit 0
Device Reserve Request Message 401
0
0
DEVICE_ID
Figure 4A
Type
7
6
Bit 0
Device Never-Used Message 402
0
1
DEVICE_ID
Byte 1
Figure 4B
4
LAST_OS
Byte 2
411
7
6
Bit 0
1
0
DEVICE_ID
Byte 1
413
412
ORIG_OS
4
INT_COUNT
Byte 2
Figure 4C
STATE_BYTE_1
Byte 3
Device State Transfer Message 403
. . .
STATE_BYTE_n
Byte 2+n
7
6
5
4
3
Bit 0
414
1
1
0
OS_ID
Byte 1
415
Resource Repartition Request Message 404
RESOURCE_ID
Byte 2
Figure 4D
AMOUNT
Byte 2
416
7
6
5
4
3
Bit 0
417
1
1
1
OS_ID
Byte 1
418
RESOURCE_ID
Byte 2
Repartition Response Message 405
PARAMETER_1
Byte 3
Figure 4E
419
Byte 4
PARAMETER_2 (optional)
420

SYSTEM AND METHODS FOR EFFICIENT AND COOPERATIVE OPERATING SYSTEM SWITCHING

PRIORITY

The present patent application claims priority to and incorporates by reference the corresponding provisional patent application Ser. No. 60/872,914, titled, "System and Methods for Efficient and Cooperative Operating System Switching," filed on Dec. 4, 2006.

RELATED APPLICATIONS

This application is related to the co-pending application entitled Secure Operating System Switching, concurrently filed on Mar. 13, 2007, U.S. patent application Ser. No. 11/724,016, assigned to the corporate assignee of the present invention.

FIELD OF THE INVENTION

The present invention relates to efficiently and cooperatively switching among multiple OSes.

BACKGROUND OF THE INVENTION

In recent years, a trend is visible that people are putting more than one OSes on the same computer. In enterprise server arena, such a feature would allow IT departments to put one server into one VM and lead to much better manageability. In software development, it enables developers to quickly test out software portability on various OSes and various versions of the same OS. Even in personal computing, people start to use multiple OSes for supporting different applications and for testing out new OS versions, or just for testing out downloaded software. On embedded devices such as smartphones, people can have two OSes for different purpose: one for private usage and one for business usage.

The predominant technique for multi-OS is virtual machine (VM) technology, which was originally developed by IBM for mainframe computers. Virtualization technology typically uses a layer of software, often called VMM (virtual machine monitor), that sits between OSes and hardware. VMM manages the real hardware and provides abstract or virtualized hardware view to OSes running on top. Implementation and porting of VM technology are complex tasks. For example, in order to support guest OSes well, any underlying device needs to be virtualized one way or the other in order for the guest OS to access the device. With a growing list of new hardware coming out everyday, this restriction may limit the applicability of VM-based approaches. The VM approach offers very high switching speed. But compared with other approaches, they incur significant development costs, and they have lower runtime efficiency especially for I/O intensive applications.

Simple solutions exist to overcome these problems when the application does not require multiple OSes running concurrently. There are multi-boot solutions. A multi-boot approach essentially time-multiplexes all the hardware resources except for hard disks which are partitioned. Switching is done through rebooting. BootMagic from PowerQuest is an example of such approach. It allows a user to install multiple OSes on the same computer but on different hard disk partitions or on different hard drives. When computer boots up, user is prompted with a list of OS choices. User will select one and computer will runs the OS of the choice. If user ever wants to run another OS, he/she will need to reboot the computer and make a different selection during the start-up. Some OSes such as Windows don't like the presence of other OS instances and may insist to reside on the first partition of the first hard drive. Boot magic will have to modify hard driver petition table and even modify BIOS temporarily to provide that illusion to such OSes. All rebooting based approaches are essentially similar to this. For example, some computer allows one to select boot device, through which multiple OSes can be supported. The only difference is that the underlying implementation is hardware based or BIOS based.

The multi-boot approach almost incurs no development cost, and its runtime efficiency is as high as that of a single OS solution. The multi-boot approach, however, has a serious drawback in extremely slow switching speed and cumbersome switching overhead. It's not atypical to find that it takes 10 s of seconds to switch from one OS to another in a multi-boot solution. Therefore, it is not suitable for applications where one needs relatively fast and convenient switching between different OSes.

An example of OS switching is described in U.S. Patent Application no. US20010018717A1, entitled, "Computer system, operating system switching system, operating system mounting method, operating system switching method, storage medium, and program transmission apparatus". The OS switching approach described therein does not attempt to virtualize any hardware components for supporting multiple OSes. In OS switching, all OS images are resident in partitioned system memory. A small OS switcher enables switching from one OS to another. Instead of virtualizing hardware components, when an OS runs, it sees and owns all the hardware of system (except that it only manages portions of system memory and storage). Switching under this arrangement is much faster than under multi-boot arrangements. Switching from OS1 to OS2 is achieved by first suspending OS1, and then resuming OS2. Implementations of OS switching use suspend/resume power management functions that already exist in OSes. The suspend process saves device states and powers off the devices, and the resume process powers on devices and restores device states.

Meanwhile, the implementation of OS switching is much simpler than VM-based technology, as there is no virtualization or abstraction layer between OSes and hardware. All the OSes run efficiently at native speed, and the new hardware support issue is delegated to each individual OS itself and is not a part of OS switcher.

However the switching time in current OS switching implementations is still much longer than those in VM systems. This long switching time makes impractical to use OS switching in certain application scenarios. For example, when OS #1 relies on OS #2 to decipher encrypted data, and when such decryption requests arise relatively frequently, it is impossible to use an OS switching based implementation because of the long switching latency.

SUMMARY OF THE INVENTION

A method and apparatus is disclosed herein for performing operating system (OS) switching. In one embodiment, the method comprising enabling a plurality of operating systems to run concurrently on a computer, wherein a first operating system in the plurality of operating systems is actively being run, the method comprising, identifying a second operating system of a plurality of operating systems that is to be active next, exchanging information between the first and second operating systems using a storage area accessible by the first and second operating systems, causing the first operating system to become inactive by performing a suspend operation; and causing the second operating system to become active by performing a resume operation to cause the second operating system to resume operation, wherein the information controls which operations are performed as part of one or both of the suspend and resume operations.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A-E illustrate embodiments of cross-communication messages.

DETAILED DESCRIPTION OF THE PRESENT INVENTION

Figure 1:
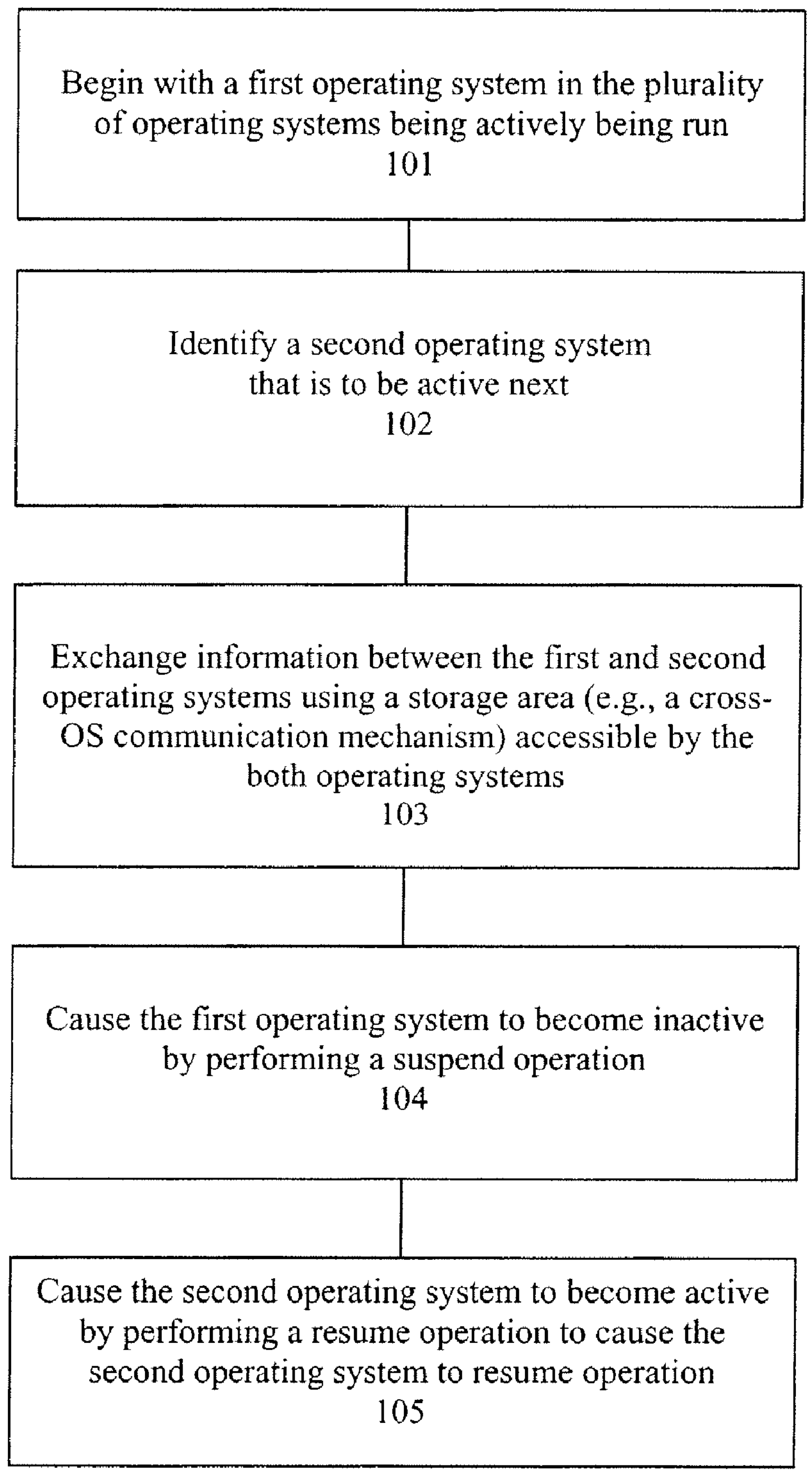
FIG. 1 is a flow diagram of one embodiment of a process for enabling a plurality of operating systems to run concurrently on a computer.

Methods and apparatuses for cooperatively switching among multiple OSes are described. There are a number of uses for OS switching. A sample usage of one embodiment is a cell phone in which two or more OSes are installed: one being an OS trusted by the operator of the cell phone, and other OSes being "open" OSes. Switching between the trusted OS and other OSes is fast for better user experience and for supporting special functionalities such as decryption.

There are numerous benefits to the approach described herein including, but not limited to, significantly reduced OS switching time, which make OS switching a practical technology for application scenarios such as described above.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of OS Switching

A system and associated methods for supporting efficient and cooperative switching among multiple operating systems running on the same computing system. In one embodiment, the system consists of an OS switcher, a cross-OS communication mechanism, a suspend controller, and a resume controller within each OS. In one embodiment, each suspend controller includes a cross-OS message generator that writes messages to the cross-OS communication mechanism. Each resume controller includes a cross-OS message interpreter that treads messages from the cross-OS communication mechanism. OSes on the same computing system use cross-OS messages to customize device suspend/resume processes, and to adjust allocation of portioned or time-multiplexed system resources.

For purposes herein, an OS switching system is a computing system with multiple operation systems installed. The multiple OSes can be live at the same time, execute in turn in a time-multiplexed manner, and can switch from one OS to another in response to user requests or to predefined events, without needing to reboot the system. Within each OS, there is a suspend controller for suspending the system before switching out of the OS, and a resume controller for resuming the system before switching into the OS.

One improvement over the OS switching system described above is the inclusion of a cross-OS communication mechanism for exchanging information among multiple OSes. In one embodiment, a cross-OS communication mechanism is a memory storage that is accessible from all installed OSes and that does not lose state during switching from one OS to another.

A cross-OS communication protocol defines the format of the information exchanged through the cross-OS communication mechanism. A cross-OS message generator within the suspend controller of each OS writes message(s) conforming to the cross-OS communication protocol to the cross-OS communication mechanism. A cross-OS message interpreter within the resume controller of each OS reads message(s) from the cross-OS communication mechanism.

Each cross-OS message conveys information including, but is limited to, the type of the message, the targeted device or resource, and information specific to the message. Types of message include, but are not limited to, device reserve request message, device never-used message, device state transfer message, resource repartition request message, and repartition response message, which will be described in more detail below.

OSes in the system use information conveyed through cross-OS messages to efficiently switch back-and-forth among OSes, and to re-negotiate resources partitioned or time-multiplexed among OSes.

FIG. 1 is a flow diagram of one embodiment of a process for enabling a plurality of operating systems to run concurrently on a computer. The process is performed by processing logic that may comprise hardware (e.g., circuitry, dedicated logic, etc.), software (such as is run on a general purpose computer system or a dedicated machine), or a combination of both.

Referring to FIG. 1, the process begins with a first operating system in the plurality of operating systems being actively being run (processing block 101). While the first operating system is currently active, processing logic identifies a second operating system that is to be active next (processing block 102).

Processing logic exchanges information between the first and second operating systems using a storage area (e.g., a cross-OS communication mechanism) accessible by the both operating systems (processing block 103). In one embodiment, the information comprises one or more messages (e.g., cross-OS messages), and at least one these message comprises a message type, an indication of a device that is the subject of the at least one message, and data relevant for the message type. In one embodiment, the message type is one of a group consisting of: a first type to request that a device be reserved for use by an operating system, a second type to indicate a device is never used by an operating system, a third type to transfer device state between two or more operating systems, a fourth type to request that a resource be partitioned by two or more operating systems, a fifth type to respond to the request that the resource be partitioned by two or more operating systems. In one embodiment, at least one of the first and second operating systems use the information to re-negotiate resources partitioned or time-multiplexed among the first and second operating systems.

Next, processing logic causes the first operating system to become inactive by performing a suspend operation (processing logic 104), and processing logic causes the second operating system to become active by performing a resume operation to cause the second operating system to resume operation (processing logic 105). The information controls which operations are performed as part of one or both of suspend and resume operations.

In one embodiment, the suspend operation includes multiple operations, and performing the suspend operation occurs without performing a set of one or more of the operations if a device is not being used. In one embodiment, the resume operation includes a resume routine for a device, and performing the resume operation is done without calling the resume routine for the device unless use of the device had been detected by the operating system that is going to be active.

In one embodiment, the information comprises usage information. In one embodiment, the usage information specifies whether the currently active operating system used a device, and wherein the suspend operation is completed without performing a suspend routine corresponding to the device if the usage information indicated that the currently active operating system did not use the device. In one embodiment, the usage information specifies whether the second operating system uses a device, and wherein the resume operation is performed without performing a resume routine corresponding to the device if the usage information indicated that the second operating system does not use the device.

In one embodiment, the information comprises device state information, and exchanging information comprises sending device state information from the first operating system to the second operating system, where the device state information corresponds to a device that is used by both the first and second operating systems and is not suspended when switching between the first and second operating systems.

In one embodiment, performing the resume operation comprises one or more drivers of the second operating system restoring hardware device states, a kernel in the second operating system restoring and resuming operation of one or more subsystems, and resuming normal operation by the second operating system. In one embodiment, performing the suspend operation comprises saving state associated with one or more sub-systems and one or more hardware devices.

One embodiment of an efficient and cooperative OS switching system. The components, the details of the cross-OS communication protocol and protocol message formats, and the handling and usages of cross-OS messages are described in detail below.

OS and Switching System Components

Figure 2:
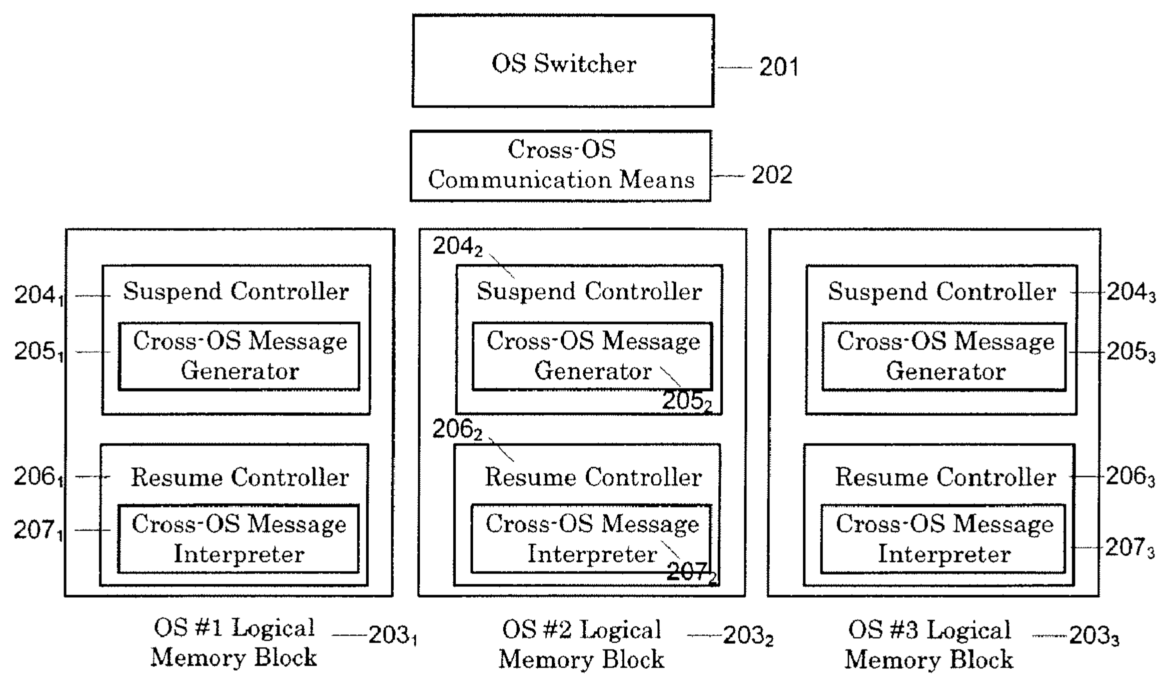
FIG. 2 illustrates a block diagram of one embodiment of an operating system (OS) switching system.

FIG. 2 is a block diagram of one embodiment of an OS switching system. Each of the components is implemented with hardware (circuitry, dedicated logic, etc.), software (such as is run on a general purpose computer system or a dedicated machine), or a combination of both.

Referring to FIG. 2, OS switcher 201 is a component that can be called to perform the switching from one OS to another.

In one embodiment, the Cross-OS Communication mechanism 202 is a set of registers. In one embodiment, the order of these registers is fixed, and this order is shared among all OSes. In another embodiment, the cross-OS Communication mechanism 202 is a portion of memory accessible to all OSes.

Three OS logical memory blocks $\mathbf{203}_{1\text{-}3}$ are shown, with each having a suspend controller ($\mathbf{204}_{1\text{-}3}$) and a resume controller ($\mathbf{206}_{1\text{-}3}$). Although the diagram shows three OSes, an OS switching system can have two or more installed OSes. Also, although OS switcher 201 is depicted as residing in a memory area independent of the OSes, it is easily understandable to a person with average knowledge of the art that the OS switcher code can be integrated into each individual OSes so that there is no longer a need for an independent memory area containing the OS switcher.

Each of suspend controllers $\mathbf{204}_{1\text{-}3}$ within each OS suspends the system before switching out of the OS and performs tasks such as sending suspend signals to applications and device drivers, and powering off some devices. Each of resume controllers $\mathbf{204}_{1\text{-}3}$ includes a cross-OS message generator, $\mathbf{205}_{1\text{-}3}$ respectively, that writes cross-OS messages to cross-OS communication mechanism 202.

Each of resume controllers ($\mathbf{206}_{1\text{-}3}$) within each OS resumes the system after switching into the OS, and performs tasks such as sending resume signals to applications and device drivers, and powering on some devices. Each resume controllers $\mathbf{206}_{1\text{-}3}$ includes a Cross-OS message interpreter ($\mathbf{207}_{1\text{-}3}$ respectively) that reads messages from cross-OS communication mechanism 202 and handles these messages.

Protocol Message Formats

Figure 3:
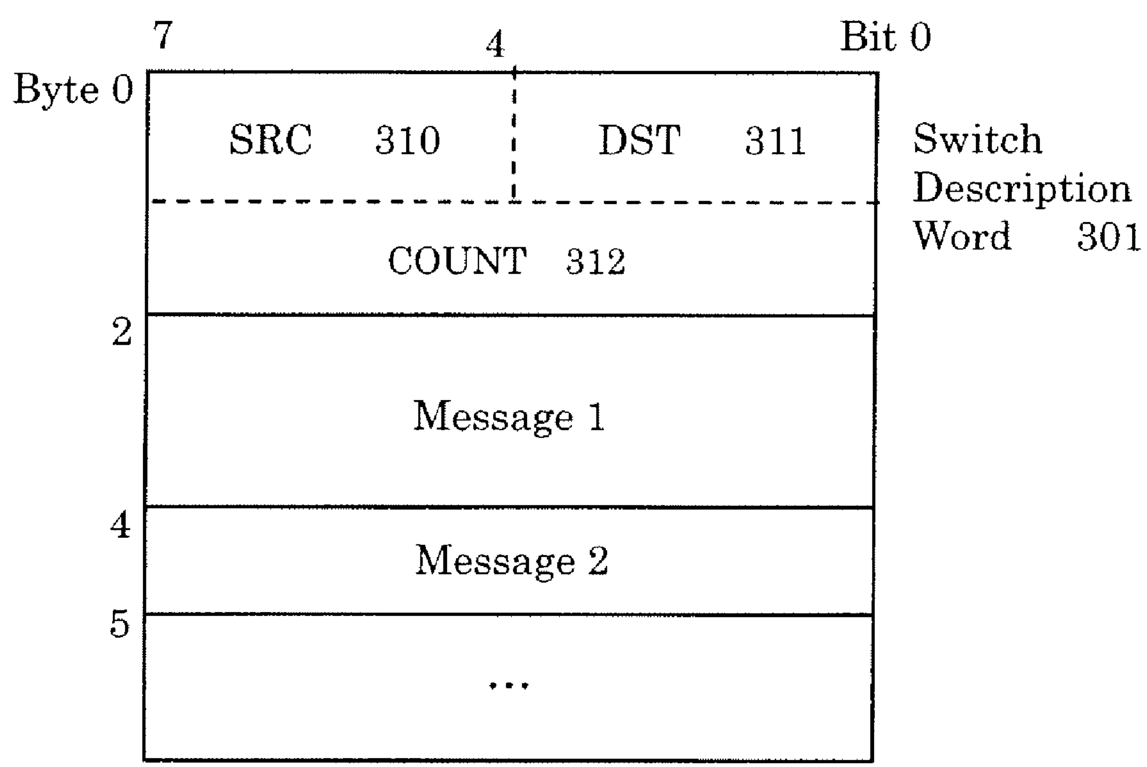
FIG. 3 illustrates the content of one embodiment of the cross-OS communication mechanism used during OS switching.

Information exchanged between OSes is through the cross-OS communication mechanism 202. FIG. 3 shows the content of one embodiment of the cross-OS communication mechanism 202 during OS switching. Referring to FIG. 3, the first two bytes of the Cross-OS communication mechanism contains a two-byte Switch-description word 301. The SRC field 310 (higher 4 bits of the first byte) of the word indicates the ID of the operating system that is currently switching out of (henceforth SRC OS). The DST field 311 (lower 4 bits of the first byte) indicates the ID of the operating system that is going to be switched into (henceforth DST OS). The COUNT field 312 (second byte) indicates the number of messages that immediately follow the Switch Description Word.

In one embodiment, the ID of each OS is assigned at the installation time of the OS. For example, the first installed OS has ID of 0, while the second OS has ID of 1, and so on.

Each cross-OS message that follows switch description word 301 is sequentially stored in the cross-OS communication mechanism, each using one or more bytes to describe the type of the message, the device or resource targeted by the message, and some optional parameters of the message.

In one embodiment, to properly communicate with each other, the multiple OSes use an agreed-upon naming scheme to identify devices and resources of the system. In one embodiment, devices of the system are labeled with numbers 0 through 62, and share such labeling knowledge cross all the OSes installed on the device. In one embodiment, the ID number 63 is reserved for "ALL DEVICES". The devices may be numbered by developers prior to use of the techniques described herein.

For resources, the number 0 is assigned as the ID for CPU time, and the number 1 is assigned for physical memory. IDs for other re-partitionable resources, such as, for example, persistent storage and network bandwidth, are left to be assigned by developers of OS switching systems for specific platforms.

In one embodiment, the protocol defines five types of cross-OS messages: the device reserve request message, the device no-usage message, the device state transfer message, the resource re-partitioning request message, and the repartitioning response message. FIGS. 4A-E illustrate one embodiment of the formats of these cross-OS messages, which are described below.

In one embodiment, the device reserve request message 401 uses one byte. The highest 2 bits of the byte is set to "00". The lower 6 bits is used to indicate the ID of the device to be reserved. The SRC OS issues a device reserve request message 401 when it does not want to perform suspend (and later resume) operation on the device. The DST OS should respect this request and not use this device, and it should forward the request to the OS to which control is switching. When the device ID of the message is set to 63, the DST OS should not use any device at all.

In one embodiment, the device never-used message 402 uses two bytes. The highest 2 bits of the first byte is set to "01". The lower 6 bits is used to indicate the ID of the device that was never used by the current OS. The lower 4 bits (411) of the second byte is used to indicate the ID of the OS that last used the device.

In one embodiment, the device state transfer message 403 uses more than two bytes. The highest 2 bits of the first byte is set to "10". The rest of the first byte is used to indicate the ID of the device whose state is being transferred. The higher 4 bits (412) of the second byte indicates the OS that initialized the device and created the message. The lower four bits (413) of the second byte indicates the number of 4-byte integers used for storing state being transferred, which immediately follows the second byte (e.g., state_byte__1, . . . , state_byte_n).

In one embodiment, the resource repartitioning request message 404 uses 3 bytes. The highest 3 bits of the first byte is set to "110". The OS_ID field 414 (lower 4 bits of the first byte) indicates the OS that made the request. The RESOURCE_ID field 415 (second byte of the message) indicates the ID of the resource to be repartitioned. The AMOUNT field 416 (third byte) indicates the amount of the resource to be reallocated. In one embodiment, the exact semantic of this field is defined by the developers of the OS switching system porting team. For example, in one implementation, when the resource to be reallocated is CPU time, the value of this byte (v) indicates that the OS making the requests (OSr) asks other OSes to switch to OSr every (v*100) milliseconds. In another implementation, when the resource to be repartitioned is physical memory, this value (v) indicates OSr asks other OSes to release v megabytes of physical memory so that OSr can have more physical memory to work with.

In one embodiment, the repartition response message 405 uses 3 or 4 bytes. The highest 3 bits of the first byte is set to "111". Again, the OS_ID field 417 (lower 4 bits of the first byte) indicates the OS that made the request. The RESOURCE_ID field 418 (second byte of the message) indicates the ID of the resource to be repartitioned. The third byte (419) and the optional fourth byte (420) indicate the amount of the resource agreed by the current OS to be yielded to the requesting OS. As above, the exact semantics of these two bytes are defined by developers. For instance, in one implementation, when the requested resource is physical memory, the second byte indicates the start address (on 1 MB boundary) of the memory area yielded to the requesting OS, while the third byte indicates the end address of the area.

Handling Cross-OS Communication Messages

The cross-OS message interpreter inside the resume controller and the cross-OS message generator inside the suspend controller of each individual OS handle cross-OS messages. In one embodiment, the resume controller and the suspend controller have shared access to memory areas containing following data structures:

my_ID: a variable indicating the ID of the current OS.

last_OS: a variable indicating the ID of the OS from which switched into current OS.

lazy_resume: a list of devices whose states are resumed only when they are used for the first time by the current OS during the current session.

my_reserved_devices: a list containing a list of device reserved by the current OS.

reserve_requests: a list containing Device Reserve Request messages.

state_transferred: a list containing Device State Transfer messages.

no_resume: a temporary list containing devices that does not need to be resumed (This is a partial list. In one embodiment, devices not in this list may not be resumed either, such as those in the my_reserved_devices list).

never_used: a list of device never-used messages.

repartition_requests: a list of resource repartition request messages.

repartition_responses: a list of repartitioning response messages.

Figure 5:
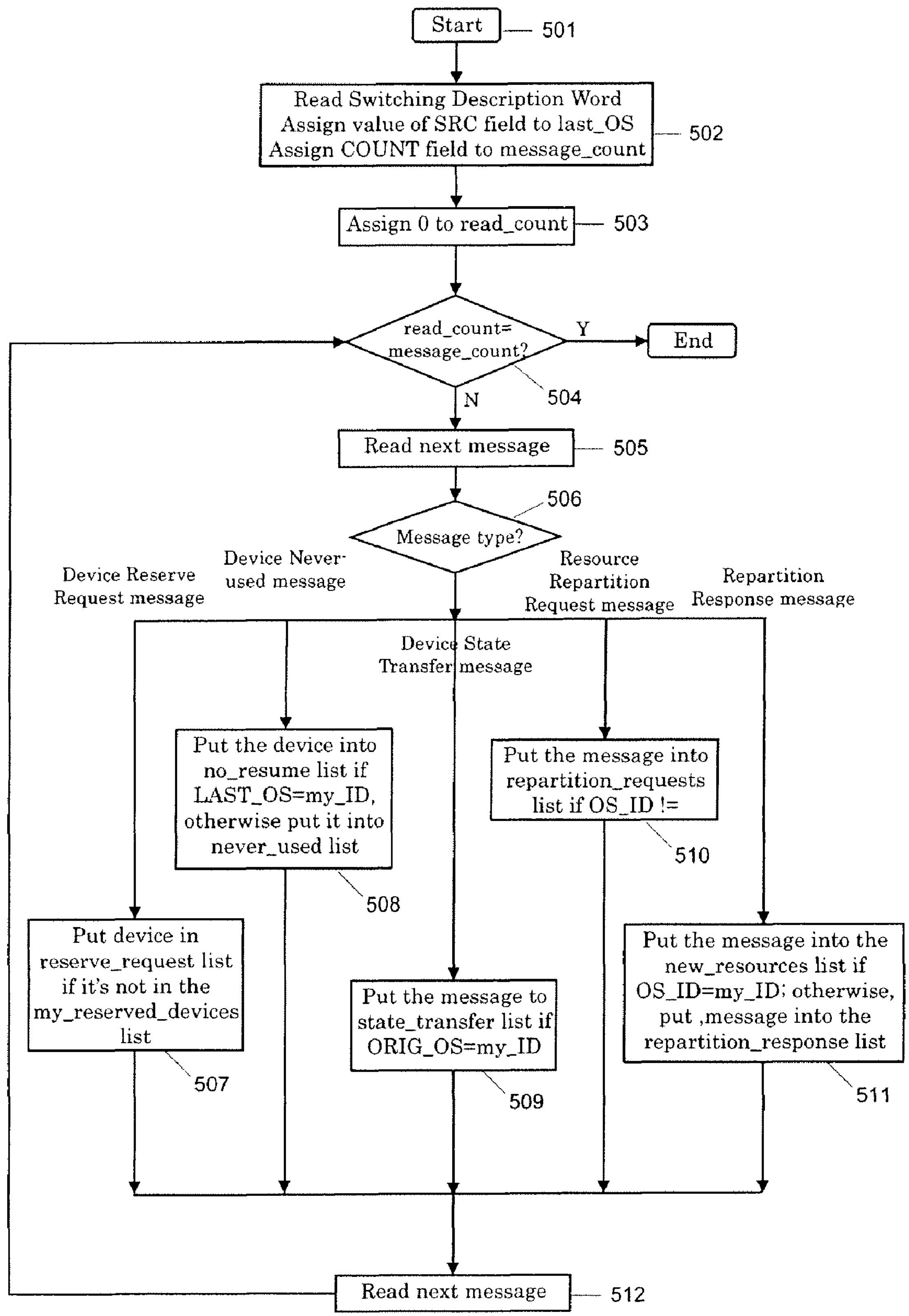
FIG. 5 is a flow diagram of one embodiment of a process of interpreting messages as performed by a cross-OS message interpreter.

In one embodiment, the cross-OS message interpreter is invoked at the start of the device resume process. FIG. 5 is a flow diagram of one embodiment of a process of interpreting messages as performed by a cross-OS message interpreter. The process is performed by processing logic that may comprise hardware (e.g., circuitry, dedicated logic, etc.), software (such as is run on a general purpose computer system or a dedicated machine), or a combination of both.

Referring to FIG. 5, the process begins by processing logic reading the switch description word from the cross-OS communication mechanism, assigning the SRC field of the word to last_OS, and assigning COUNT filed to temporary variable message_count (processing block 502). Then, processing logic assigns 0 to the temporary variable referred to as read_count (processing block 503).

Next, processing logic tests whether read_count is equal to message_count (processing block 504). If it is, the process ends. If not, the process continues onto processing block 505 where processing logic reads the next message. After reading the next message, processing logic tests the type of the next message (processing block 506). Processing logic obtains the type of the next message and then switches based on message type:

i. For a device reserve request message, processing logic ignores the message if the device is in my_reserved_devices list; otherwise, processing logic puts the device in reserve_requests list (processing block 507).

ii. For a device never-used message, if the "LAST_OS" field of the message is equal to my_ID, then processing logic puts the device to the no_resume list; otherwise, processing logic puts the device to the never_used list (processing block 508).

iii. For a device state transfer message, processing logic puts the message to state_transferred list if the "ORIG_OS" field is not equal to my_ID (processing block 509).

iv. For a resource repartition request message, processing logic ignores the message if the "OS_ID" field of the message is equal to my_ID; otherwise, processing logic puts into the repartition_requests list (processing block 510).

v. For a repartition response message, processing logic puts the message into the new_resources list if the "OS_ID" field of the message is equal to my_ID; otherwise, processing logic puts the message into the repartition_responses list (processing block 511).

After processing the message, processing logic increments read_count by 1, reads the next message (512) and transitions to processing block 504 where the process repeats.

Figure 6:
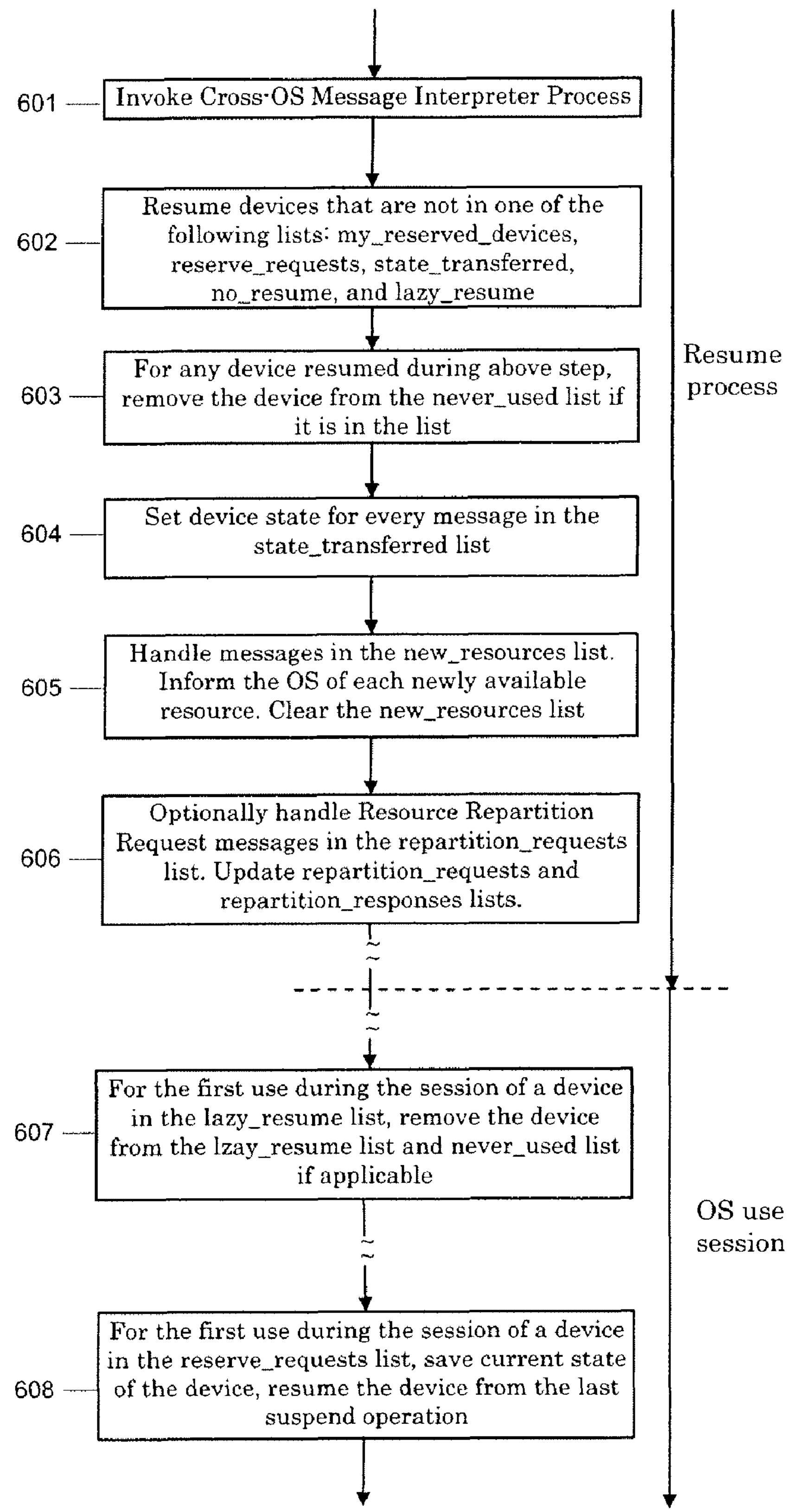
FIG. 6 is a flow diagram of one embodiment of the device resume process within the resume controller code.

FIG. 6 is a flow diagram of one embodiment of the device resume process within the resume controller code. The process is performed by processing logic that may comprise hardware (e.g., circuitry, dedicated logic, etc.), software (such as is run on a general purpose computer system or a dedicated machine), or a combination of both.

Referring to FIG. 6, the process begins by processing logic invoking a cross-OS message interpreter process (processing block 601). Then, processing logic resumes devices that are not in any of the following lists: the my_reserved_devices list, the reserve_requests list, the state_transferred list, the lazy_resume list, or the no_resume list (processing block 602). In one embodiment, as a special case, when a device in the my_reserved_devices list, the reserve_requests list, the lazy_resume list, or the no_resume list has an ID of 63 ("ALL DEVICES"), the resume code will not do conduct resume operation for any device. In the case of two OSes, this is detected by the first OSes. When there are multiple OSes used between the suspect and resume of the $2^{nd}$ OS, if any of these OSes used the device, then the $2^{nd}$ OS needs to resume the device. If one of the OSes used the device, then the $2^{nd}$ OS will see a Device_never_used message indicating that the $2^{nd}$ OS is the last one used the device. Otherwise, the $2^{nd}$ OS will not see such message and will need to resume the device.

Depending on the specific device being resumed, the resume operation may either directly restore the state of the device, or restore the state after reinitializing the device.

Processing logic removes any device resumed processing block 602 from the never_used list if it is in the list (processing block 603). Next, for each message in the state_transferred list, processing logic sets the state of the device with the state included in the message (processing block 604). Processing logic handles messages in the new_resources list, informs the OS of each newly available resource, and then clears the list (processing block 605). For example, for a repartition response message for physical memory, processing logic informs the current OS of the address range of the newly available physical memory area.

Processing logic may optionally handle the resource repartition_request messages in the repartition_requests list and update the repartition_request list as well as the repartition_responses list, if applicable (processing block 606).

The remainder of the device resume process is performed during the normal OS use session. More specifically, when a device is used for the first time and the device is in the lazy_resume list, processing logic performs a resume on the device, and the device is removed from the lazy_resume list as well as the never_used list (if it is previously in the list) (processing block 607). Also, when a device is used for the first time during current session and the device is in the reserve_requests list, processing logic saves the current state of the device, and performs a resume operation for the device with state obtained from an earlier suspend process.

One Embodiment of a Suspend Procedure

Figure 7:
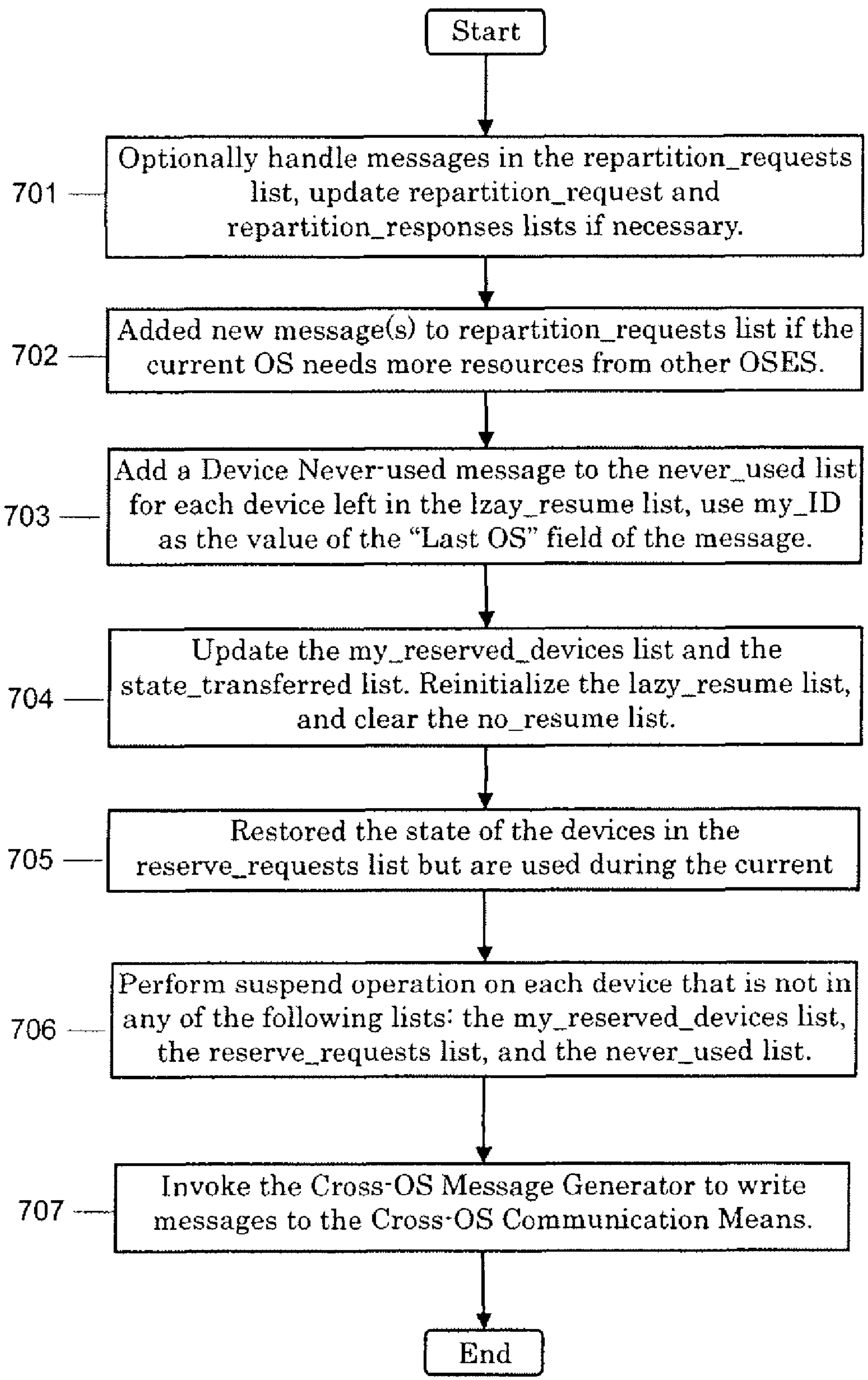
FIG. 7 is a flow diagram of one embodiment of a process for suspending devices.

The device suspend process is conducted by the suspend controller. FIG. 7 is a flow diagram of one embodiment of a process for suspending devices. The process is performed by processing logic that may comprise hardware (circuitry, dedicated logic, etc.), software (such as is run on a general purpose computer system or a dedicated machine), or a combination of both.

The process begins with processing logic optionally handling messages in the repartition_requests list, update repartition_request and repartition_responses lists if applicable (processing block 701).

Next, processing logic updates repartition_requests list if the current OS needs more resources from other OSes (processing block 702). Then processing logic adds devices that are left in the lazy_resume list to the never_used list, if they are not already in the list, using last_OS as the value of the "Last OS" field of the Device Never-used message (processing block 703). Processing logic also updates the my_reserved_devices list and the state_transferred list (processing block 704). In one embodiment, the state_transferred list is updated by adding new message(s) to the state_transferred list if the current OS initiated device(s) wants to transfer states of such device(s) to other OSes. Also as part of processing block 704, processing logic reinitialize the lazy_resume list and clears the no_resume list.

Afterwards, processing logic restores the states of the devices that are in the reserve_requests list but were used during the current session (processing block 705) and performs a suspend operation on each device that is not in any of the following lists: the my_reserved_devices list, the reserve_requests list, the never_used list, or the state_transferred list (processing block 706). In on embodiment, as a special case, if a device with ID of 63 ("ALL DEVICES") is in any of the former three lists, then no suspend operation is conducted on any device.

Lastly, processing logic invokes the cross-OS message generator to write messages to the cross-OS communication mechanism (processing block 707).

One Embodiment of a Process for Generating Messages

Figure 8:
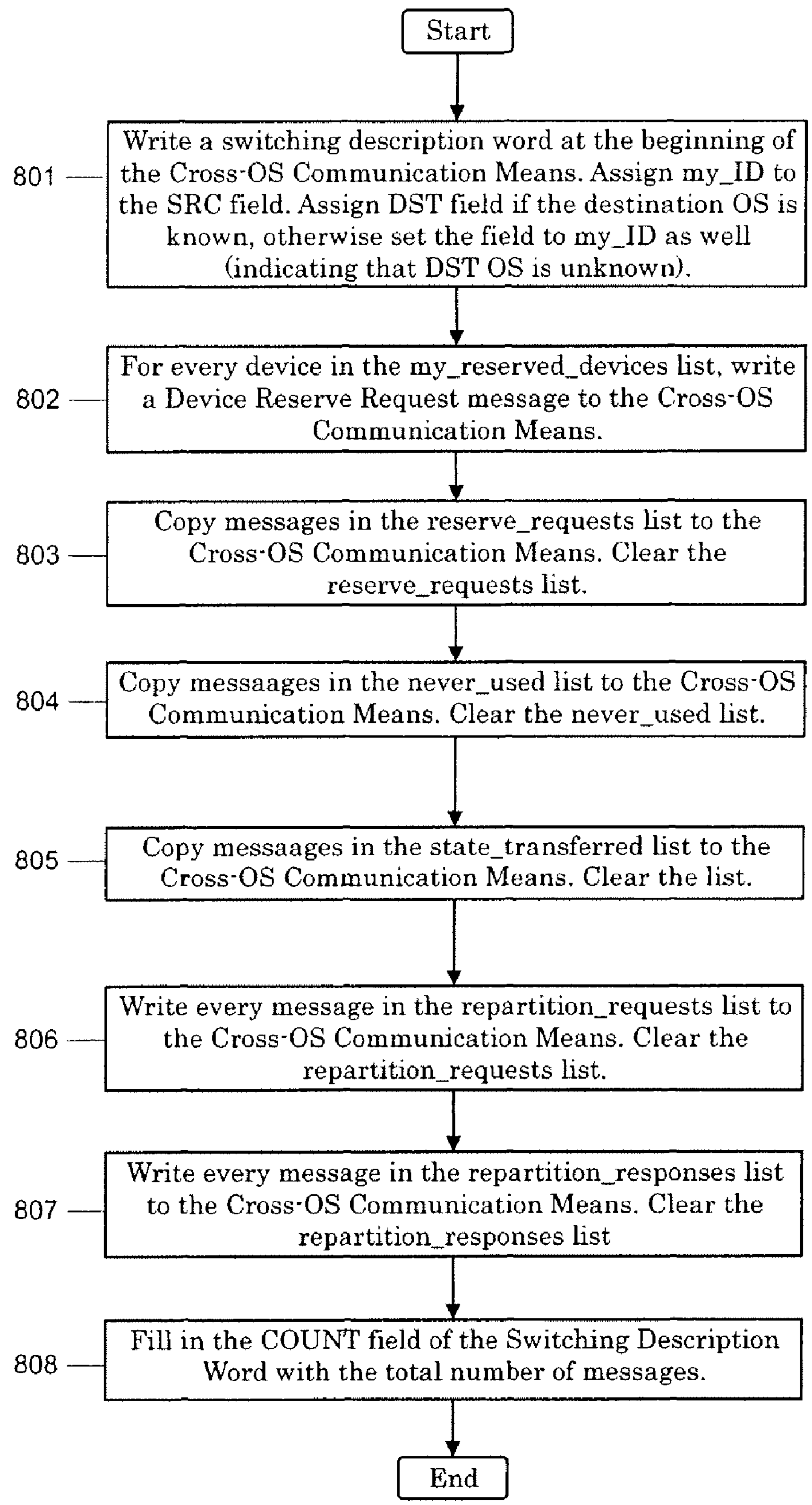
FIG. 8 is a flow diagram of one embodiment of a process for generating messages with a cross-OS message generator.

FIG. 8 is a flow diagram of one embodiment of a process for generating messages with a cross-OS message generator. The process is performed by processing logic that may comprise hardware (circuitry, dedicated logic, etc.), software (such as is run on a general purpose computer system or a dedicated machine), or a combination of both.

The process begins with processing logic writing a switching description word at the beginning of the cross-OS communication mechanism, assigning my_ID to the SRC field, assigning the DST field if the destination OS is known; otherwise, processing logic sets the field to my_ID as well (indicating that DST OS is unknown) (processing block 801). Processing logic also leaves the COUNT field unfilled.

Next, for every device in the my_reserved_devices list, processing logic writes a Device Reserve Request message to the cross-OS communication mechanism (processing block 802) and copies messages in the reserve_requests list to the cross-OS communication mechanism and then clears the reserve_requests list (processing block 803). Processing logic also copies messages in the never_used list to the cross-OS communication mechanism and then clears the never_used list (processing block 804). Similarly, processing logic copies messages in the state_transferred list to the cross-OS communication mechanism and then clears the state_transferred list (processing block 805).

Afterwards, processing logic writes every message in the repartition_requests list to the cross-OS Communication mechanism and clears the repartition_requests list (processing block 806). Then processing logic writes every message in the repartition_responses list to the cross-OS communication mechanism and clears the repartition_responses list (processing block 807).

Lastly, processing logic fills in the COUNT field of the switching description word with the total number of messages written to the cross-OS communication mechanism (processing logic 808).

Examples of Use Cases

Several use cases are described below that use the techniques described herein. It will be apparent that these use cases consists only a small portion of the application domain of the present invention.

In one use case, where an OS (OS1) seldom uses a device (D1), the suspend controller of OS1 adds the ID of device D1 to the lazy_resume list. Later, when the resume process is performed by the resume controller of OS1, device D1 is not resumed during the process. Rather, device D1 is resumed when it is used for the first time during the session. This quickens the resume process.

In the second use case, if the above device D1 is not used and thus never resumed, device D1 will be added to the never_used list according to the suspend process described above, and thus does not need to be suspended. This improves the speed of the overall suspend process.

In yet another use case, the device suspend process of an OS (OS2) puts the device with ID of 63 ("ALL DEVICES") into the my_reserved_devices list, so that none of the devices is suspended. A device reserve request message is subsequently written to the cross-OS communication mechanism by the cross-OS message generator. Any subsequently running OSes will observe this message, and will only resume a device when it is first used during the session and will restore its state during its suspend process. Each of these OSes will also forward the message to next OS. Eventually the message will be read by the cross-OS message interpreter within OS2, which will inform the rest of the resume controller code to not perform resume operation on any of the devices. It is thus possible to very quickly switch out of and back into OS2 .

In yet another use case, an OS (OS3) initializes a network device and obtains an IP addresses. During the suspend process of OS3, a device state transfer message is written to the cross-OS communication mechanism. The INT_COUNT field of the message is set to 4, and the 16 (four 4-byte integers) state bytes contain the IP addresses of the network device, the default gateway address, the DNS address, and the subnet mask. The cross-OS message interpreter within the subsequent OS reads this message and informs the rest of the resume controller code to set the logical state of the network device without conducting a resume operation on it.

In yet another use case, an OS (OS4) writes a resource repartitioning request message into the cross-OS communication mechanism, with the RESOURCE_ID field set to the ID of CPU time, and the AMOUNT field set to 5, meaning that OS4 requests to gain the right of execution every 500 milliseconds. The subsequent OS reads the message, respects the request, and switches back to OS4 after about 500 milliseconds.

In yet another scenario, one of the OSes, OS1, is dedicated to encryption/decryption, and uses no I/O devices. When another OS, OS2, switches to OS1 for encryption and then switches back, OS2 does not need to suspend any I/O device when it switches out (and it does not need to resume any I/O devices when switched back into it), and OS1 does not need to do any resume or suspend of I/O devices either.

In still another scenario, one of the OSes, such as a Windows OS, supports a special device, such as a gaming device, while another device, such as a Linux OS, does not support this special device. When the Windows OS switches to the Linux OS, the Windows OS does not need to suspend the special device. When it switches back from the Linux OS, the Windows OS does not need to resume the special device.

In another possible scenario, although both OSes, such as a Windows OS and a Linux OS, support a networking device, the configuration may be such that the networking device is only used in the Windows OS, but not in the Linux OS. In this case, when the Windows OS switches to the Linux OS, the Windows OS does not need to suspend the networking device. When it switches back from the Linux OS, the Windows OS does not need to resume the networking device.

An Example of a Computer System

Figure 9:
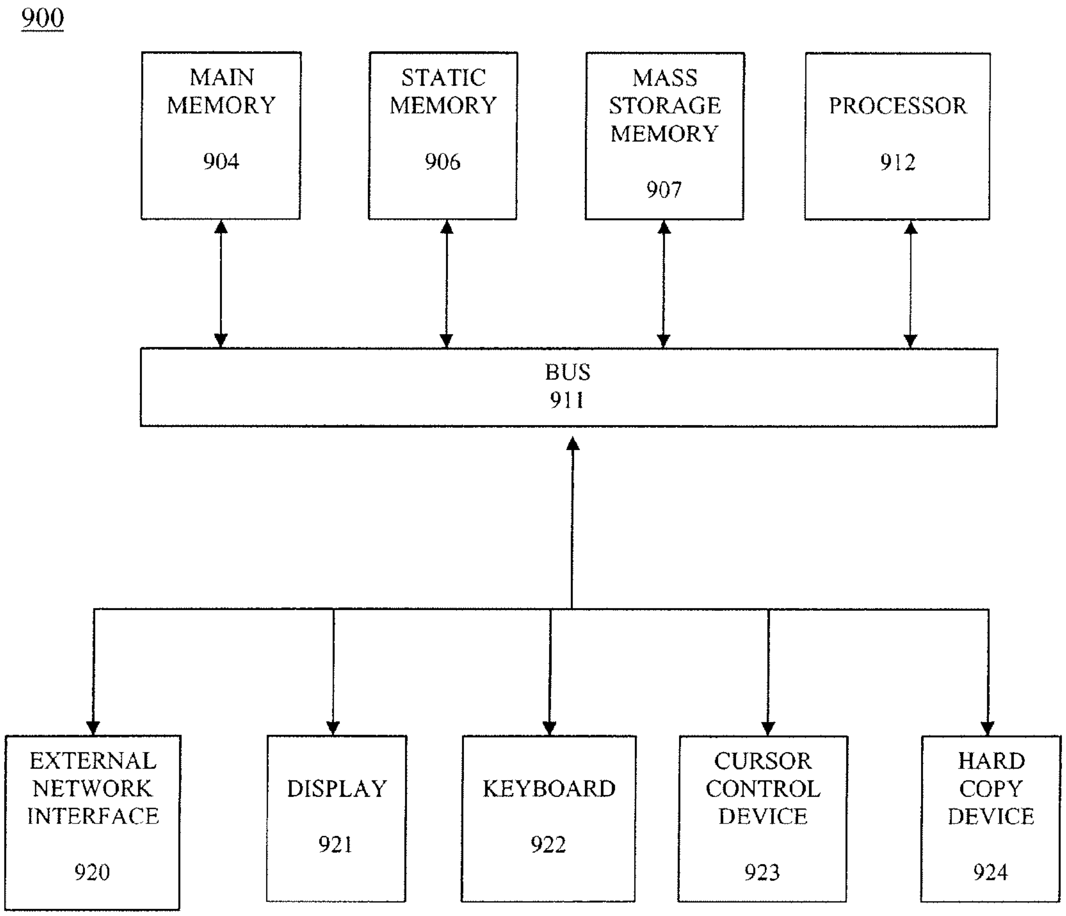
FIG. 9 is a block diagram of an exemplary computer system.

FIG. 9 is a block diagram of an exemplary computer system that may perform one or more of the operations described herein. Referring to FIG. 9, computer system 900 may comprise an exemplary client or server computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, Alpha™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for marking information on a medium such as paper, film, or similar types of media. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for enabling a plurality of operating systems to run concurrently on a computer, wherein a first operating system in the plurality of operating systems is actively being run, the method comprising:
- identifying a second operating system of a plurality of operating systems that is to be active next;
- exchanging information between the first and second operating systems using a storage area accessible by the first and second operating systems;
- causing the first operating system to become inactive by performing a suspend operation, wherein the suspend operation includes a plurality of operations, and further wherein performing the suspend operation occurs without performing a set of one or more of the plurality of operations if a device is not being used; and
- causing the second operating system to become active by performing a resume operation to cause the second operating system to resume operation, wherein the information controls which operations are performed as part of one or both of the suspend and resume operations.

2. The method defined in claim 1 wherein the information comprises one or more messages, and further wherein at least one message of the one or more messages comprises a message type, an indication of a device that is the subject of the at least one message, and data relevant for the message type.

3. The method defined in claim 2 wherein the message type is one of a group consisting of: a first type to request that a device be reserved for use by an operating system, a second type to indicate a device is never used by an operating system, a third type to transfer device state between two or more operating systems, a fourth type to request that a resource be partitioned by two or more operating systems, and a fifth type to respond to the request that the resource be partitioned by two or more operating systems.

4. The method defined in claim 1 wherein the information comprises usage information.

5. The method defined in claim 1 wherein the information comprises device state information.

6. The method defined in claim 1 wherein at least one of the first and second operating systems use the information to re-negotiate resources partitioned or time-multiplexed among the first and second operating systems.

7. The method defined in claim 1 wherein performing the resume operation comprises:
- one or more drivers of the second operating system restoring hardware device states;
- a kernel in the second operating system restoring and resuming operation of one or more subsystems; and
- resuming normal operation by the second operating system.

8. The method defined in claim 7 wherein performing the suspend operation comprises saving state associated with one or more sub-systems and one or more hardware devices.

9. A method for enabling a plurality of operating systems to run concurrently on a computer, wherein a first operating system in the plurality of operating systems is actively being run, the method comprising:
- identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the resume operation includes a resume routine for a device, and further wherein the resume operation is performed without calling the resume routine for the device unless use of the device had been detected by one or more preceding operating systems.

10. A method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the information comprises usage information, and further wherein the usage information specifies whether the first operating system used a device, and wherein the suspend operation is performed without performing a suspend routine corresponding to the device if the usage information indicated that the first operating system did not use the device.

11. A method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the information comprises usage information, and further wherein the usage information specifies whether the second operating system uses a device, and wherein the resume operation is performed without performing a resume routine corresponding to the device if the usage information indicated that the second operating system does not use the device.

12. A method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the information comprises device state information, and further wherein exchanging information comprises sending device state information from the first operating system to the second operating system, wherein the device state information corresponds to a device that is used by both the first and second operating systems and is not suspended when switching between the first and second operating systems.

13. An article of manufacture having one or more computer readable storage media storing instructions thereon which, when executed by a system, cause the system to perform a method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation, wherein the suspend operation includes a plurality of operations, and further wherein performing the suspend operation occurs without performing a set of one or more of the plurality of operations if a device is not being used; and causing the second operating system to become active by performing a resume operation to cause the second operating system to resume operation, wherein the information controls which operations are performed as part of one or both of the suspend and resume operations.

14. The article of manufacture defined in claim 13 wherein the information comprises one or more messages, and further wherein at least one message of the one or more messages comprises a message type, an indication of a device that is the subject of the at least one message, and data relevant for the message type.

15. The article of manufacture defined in claim 13 wherein the information comprises device state information.

16. The article of manufacture defined in claim 13 wherein at least one of the first and second operating systems use the information to re-negotiate resources partitioned or time-multiplexed among the first and second operating systems.

17. An article of manufacture having one or more computer readable storage media storing instructions thereon which, when executed by a system, cause the system to perform a method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the resume operation includes a resume routine for a device, and further wherein the resume operation is performed without calling the resume routine for the device unless use of the device had been detected by a preceding operating system.

18. An article of manufacture having one or more computer readable storage media storing instructions thereon which, when executed by a system, cause the system to perform a method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the information comprises usage information, and further wherein the usage information specifies whether the first operating system used a device, and wherein the suspend operation is performed without performing a suspend routine corresponding to the device if the usage information indicated that the first operating system did not use the device.

19. An article of manufacture having one or more computer readable storage media storing instructions thereon which, when executed by a system, cause the system to perform a method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the information comprises passing usage information, and further wherein the usage information specifies whether the second operating system uses a device, and wherein the resume operation is performed without performing a resume routine corresponding to the device if the usage information indicated that the second operating system does not use the device.

20. An article of manufacture having one or more computer readable storage media storing instructions thereon which, when executed by a system, cause the system to perform a method for enabling a plurality of operating systems to run concurrently on a computer, wherein a first operating system in the plurality of operating systems is actively being run, the method comprising:

identifying a second operating system of a plurality of operating systems that is to be active next;

exchanging information between the first and second operating systems using a storage area accessible by the first and second operating systems;

causing the first operating system to become inactive by performing a suspend operation; and causing the second operating system to become active by performing a resume operation to cause the second operating system to resume operation, wherein the information controls which operations are performed as part of one or both of the suspend and resume operations, wherein the information comprises device state information, and further wherein exchanging information comprises sending device state information from the first operating system to the second operating system, wherein the device state information corresponds to a device that is used by both the first and second operating systems and is not suspended when switching between the first and second operating systems.

21. A system comprising:

one or more memories to store a plurality of operating systems;

a memory to store an operating system switcher to cause a currently active operating system to become inactive and a non-active operating system to become active, wherein the switcher comprises a memory access controller module to enable access and disable access to a plurality of regions of the one or more memories by the plurality of operating systems, wherein the memory access controller disables access to a plurality memory regions for operating systems other than the one operating system during switching mode when the switcher causes the currently active operating system to become inactive and the non-active operating system to become active, wherein individual operating systems include a suspend controller to perform a suspend operation to handle transition of the individual operating system from active to inactive, and a resume controller to perform a resume operation to handle transition of the individual operating system from inactive to active; and a cross operating system storage area to exchange information between operating systems, the storage area being accessible by the operating systems, and wherein the information controls which operations are performed as part of one or both of the suspend and resume operations performed by suspend and resume controllers, respectively, and further wherein the suspend operation includes a plurality of operations, and further wherein performing the suspend operation occurs without performing a set of one or more of the plurality of operations if a device is not being used.

22. The system defined in claim 21 wherein the suspend controller comprises a message generator to create one or more messages and send created messages to the cross operating system storage area for access by at least one other operating system.

23. The system defined in claim 21 wherein the resume controller comprises a message interpreter to interpret one or more messages accessed from the cross operating system storage area and generated by at least one other operating system.

* * * * *